Figures 1, 2:
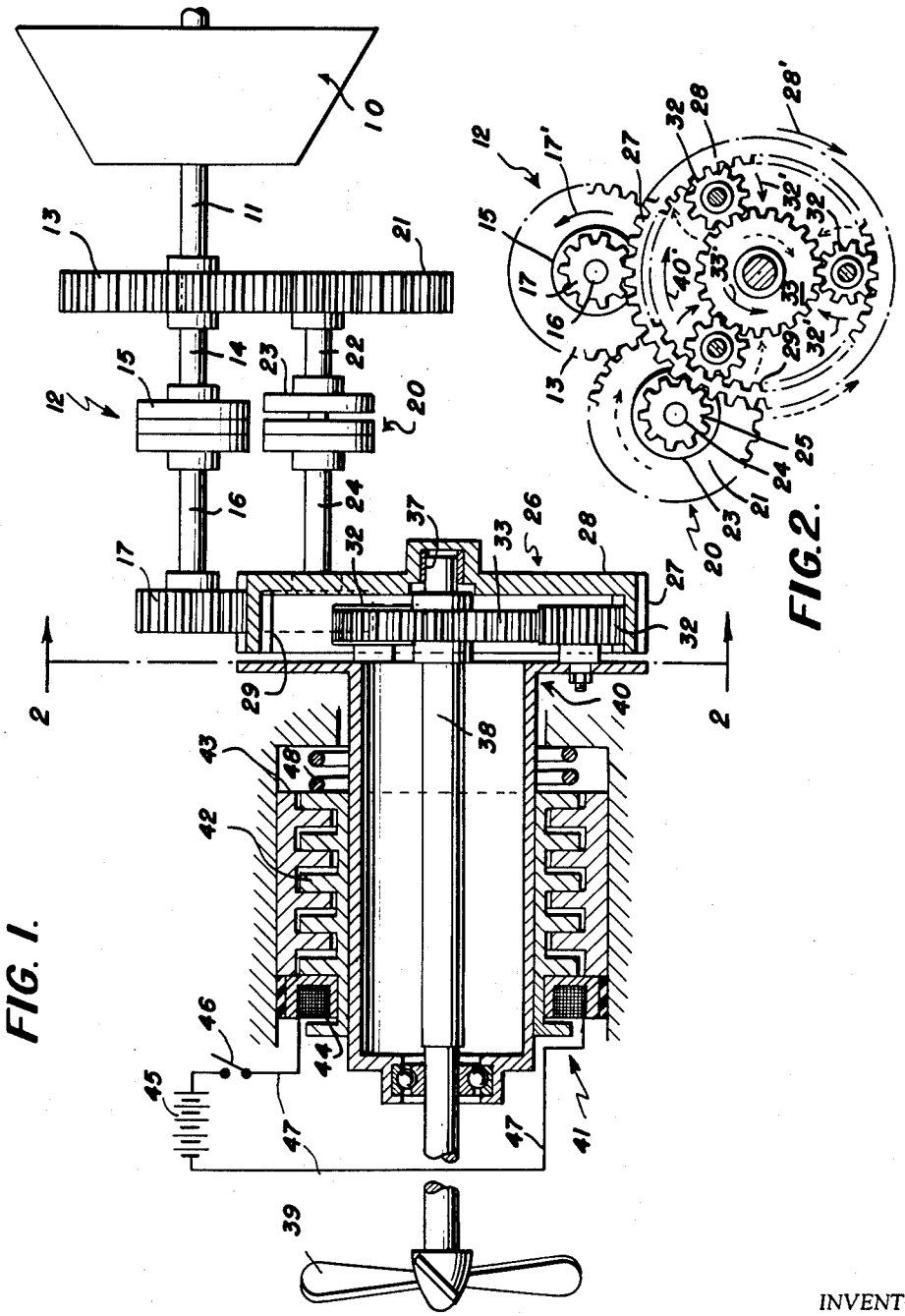

June 12, 1956  F. K. FISCHER ET AL  2,749,776
REVERSING GEAR AND DRIVE CONTROL
Filed March 17, 1952

INVENTORS
FREDERIK K. FISCHER
WILLIAM H. BARTOLETT

BY *George Sipkin*
ATTORNEY

2,749,776
REVERSING GEAR AND DRIVE CONTROL

Frederick K. Fischer, Lansdowne, Pa., and William H. Bartolett, Haddonfield, N. J., assignors, by mesne assignments, to the United States of America as represented by the Secretary of the Navy Application March 17, 1952, Serial No. 277,018

2 Claims. (Cl. 74—740)

This invention relates to a reversing transmission particularly adapted for use with a marine propulsion unit. The transmission is of universal application however, and is not limited to a specific motor drive.

It is a main object of the invention to provide a clutch and gear transmission of improved efficiency to operate selectively a driven element in a forward or reverse direction from a power source turning in one direction.

The present invention utilizes a simplified gear arrangement in combination with clutches that control the direction power is transmitted in. A brake is associated with the gearing in order to transmit power, and to help absorb the energy of reversal upon reversal of direction of torque.

An object of the invention is to provide an improved two direction transmission utilizing suitable gearing in combination with a brake to make possible efficient reversal of direction of torque transmission.

A further object is to provide a planetary gear arrangement in combination with a brake in a marine transmission unit.

A specific object is to provide a marine transmission including a planetary gear train for selectively rotating a propeller shaft in forward or reverse direction.

Other objects and features of the invention will become apparent to those skilled in the art as the disclosure is made in the following detailed description of a preferred embodiment of the invention illustrated in the accompanying sheet of drawing in which:

Figure 1 is a sectional view of a complete transmission, in accordance with a preferred embodiment of the invention in a simplified form for illustrating the invention without burdensome detail; and Figure 2 is a detailed section taken along the line 2—2 of Figure 1.

In the embodiment illustrated herein a power source 10 turns drive shaft 11 from which torque may selectively be transmitted in one of two parallel paths. Path 12 is used to transmit torque in a forward direction. Path 12 includes gear 13, shaft 14, clutch 15, shaft 16, and gear 17. Path 20 is used to transmit torque in a reverse direction since reversing gear 21 is constantly in mesh with gear 13. Path 20 includes shaft 22, clutch 23, shaft 24, and gear 25.

Gears 17 and 25 transmit energy to planetary unit 26 since they are constantly in mesh with outer teeth 27 of ring gear 28. Ring gear 28 also includes inner teeth 29 which are constantly in contact with planetary gears 32. These latter gears mesh with sun gear 33. Ring gear 28 is rotatably carried on bearing 37 which rides on an extension of propeller shaft 38. Shaft 38 carries propeller 39.

The planetary gears are affixed to carrier 40. The rotation of carrier 40 is controlled by brake 41 which may be electro-magnetic, mechanical, fluid or of any desired type. An electro-magnetic type is illustrated in Figure 1.

This brake is preferably arranged so that brake members 42 and 43 are normally in engagement although it may be arranged so that the brake members are normally out of engagement. Brake members 42 and 43 include a number of annular friction faces that are engageable to absorb energy. Solenoid 44 may be energized by application of an electric current from battery 45, through switch 46 and wires 47. In the embodiment illustrated, passage of current through solenoid 44 creates a magnetic field that acts to separate clutch members 42 and 43 against the action of spring 48.

In operation, power source 10 rotates gears 13 and 21 through shaft 11. Since these two gears are in mesh constantly, they will rotate in opposite directions. Depending upon whether clutch 15 or clutch 23 is engaged, torque will be transmitted to either spur gear 17 or spur gear 25. These clutches are of any conventional type and their mode of actuation is immaterial insofar as this invention is concerned.

If it is desired to rotate propeller 39 in a "forward" direction, clutch 15 is energized and torque is transmitted to spur gear 17 and thence to ring gear 28.

Ring gear 28 may be thought of as the input connection to a planetary gear unit having three power connections. The remaining two connections are the planet carrier 40 and the propeller shaft 38. If one of these last two connections is restrained from movement the other will become the output connection. Since brake members 42 and 43 are normally frictionally engaged carrier 40 cannot rotate; consequently propeller shaft 38 becomes the output connection. Ring gear 28 turns in the direction indicated by arrow 28'. This rotates the planet gears in direction 32'. Torque is transmitted to sun gear 33 in direction 33'. This causes propeller shaft 38 to turn propeller 39 in a "forward" direction.

When it is desired to drive the propeller in "reverse" direction, switch 46 is depressed to allow current to flow into solenoid 44. Members 42 and 43 are thereby separated, making it possible for planet carrier 40 to commence rotating. Clutch 15 is then de-energized. The propeller shaft then becomes the driver or input connection of the planetary unit; carrier 40 and ring gear 28 become the output connections. Since neither of these last two are prevented from turning they continue to rotate in the forward direction, being supplied with energy due to their own momentum and that of the propeller with its shaft.

Clutch 23 is then actuated. Since ring gear 28 is still turning in a "forward" direction, shaft 24 will be rotating in a direction opposite to that in which shaft 22 is turning. Therefore the direction of rotation of shaft 24 must be reversed before reversing torque from power source 10 may be applied to the planetary gear unit 26. This is very readily accomplished since planet gear carrier 40 is still free to rotate. Clutch 23 does not have to dissipate very much energy but rather acts as a lever to divert the "forward" energy still in the system to gear carrier 40.

Switch 46 is then opened to de-energize solenoid 44. Members 42 and 43 come into engagement. Since member 42 is turning, energy will be dissipated between brake members 42 and 43 until planet carrier 40, driven by the momentum of the parts fixed to propeller 39, ceases to rotate. At that time torque will be transmitted in "reverse" direction through clutch 23, shaft 24, gear 25, ring gear 28, planetary gears 32, sun gear 33, propeller shaft 38, and to propeller 39.

When the control is such as to require the propeller 39 to change its rotation from reverse to forward, switch 46 is closed so that solenoid 44 will be effective to separate members 42 and 43. Then reverse clutch 23 is declutched. This is followed by the energization of forward clutch 15, and the engaging of members 42 and 43. The sequence of operations is similar to that already described for forward to reverse operation except for the direction of rotation of the elements controlled by the clutches 15 and 23.

It will be noted that the transmission is unique in that every part is utilized to allow reversal of rotation in a very efficient manner. Brake 41 is designed to absorb most of the energy of the rotating parts during reversal of their direction of rotation. Only a small amount of the energy of reversal is absorbed by the high speed clutches 15 and 23. This is desired since 15 and 23 are high speed clutches and therefore are very difficult to design for high energy absorption.

It is apparent that the various gears absorb and transfer energy from one part of the system to another very smoothly. Furthermore, when rotation is reversed there is no sudden jolt to cause chipping of gears and wear of clutches. Provision is made for easily and quickly reversing direction of energy flow from power source 10 to propeller 39.

It should be understood, of course, that the foregoing disclosure relates to only a preferred embodiment of the invention and that numerous modifications or alterations may be made therein without departing from the spirit and the scope of the invention as set forth in the appended claims:

What is claimed is:

1. A marine propulsion unit for operating a propeller shaft from a power source which comprises a ring gear rotatably mounted on said shaft, a pair of independently operable clutches, driving connections between each clutch and said ring gear, a main drive shaft between one of said clutches and said power source for rotation of the ring gear in one direction, an auxiliary drive shaft for said other clutch and connections between said main and said auxiliary drive shafts for rotation of said ring gear in the other direction, a gear train between the propeller shaft and said ring gear for selectively rotating the propeller shaft in either of its directions of rotation, a brake drum rotatably mounted about the propeller shaft and having one end received by said gear train to be rotatably driven thereby, holding means for preventing rotation of said brake drum when the propeller shaft is driven in either direction by one of said independently operable clutches, releasing means for said holding means to permit rotation of the brake drum through said gear train, during the propeller shaft drive changeover of operation between the main and the auxiliary drive shafts, to absorb the energy of the momentum of the propeller shaft.

2. A marine propulsion unit for operating a propeller shaft from a power source which comprises an internal-external ring gear rotatably mounted on said shaft, a pair of independently operable clutches, a spur gear for each clutch operably connected to the external periphery of said ring gear, a main drive shaft between one of said clutches and said power source for clockwise rotation of the ring gear, an auxiliary drive shaft for said other clutch and a gear train between said main drive and said auxiliary drive shafts providing counterclockwise rotation of said ring gear, a sun gear within said ring gear and fixed to the propeller shaft, planetary gearing between the sun gear and the internal periphery of the ring gear, a brake drum coaxial of the propeller shaft having one end rotatably mounted on the propeller shaft and its other end fixed to said planetary gearing, disk means carried by said brake drum, holding means for said disk means effective when the propeller shaft is driven in either a clockwise or counterclockwise direction by one of said independently operable clutches, releasing means for said holding means to permit rotation of the brake drum and disk means through the planetary gearing during the propeller shaft drive changeover of operation between the main and the auxiliary drive shafts to absorb energy of the momentum of the propeller shaft.

References Cited in the file of this patent

UNITED STATES PATENTS

| 160,877 | Chapman | Mar. 16, 1875 |
| 1,165,019 | Pederson | Dec. 21, 1915 |
| 1,722,302 | Lamb | July 30, 1929 |
| 2,217,464 | Arnold | Oct. 8, 1940 |
| 2,439,079 | Davidson | Apr. 6, 1948 |
| 2,536,897 | Wood | Jan. 2, 1951 |
| 2,592,210 | Swennes | Apr. 8, 1952 |

FOREIGN PATENTS

| 405,557 | Germany | Nov. 7, 1924 |
| 698,025 | France | Jan. 26, 1931 |